United States Patent
Su

(10) Patent No.: US 10,186,908 B2
(45) Date of Patent: Jan. 22, 2019

(54) EFFICIENT POWER TRANSMITTING TERMINAL, CONTACTLESS POWER TRANSMISSION DEVICE AND POWER TRANSMISSION METHOD

(71) Applicant: Ningbo WeiE Electronic Technology Co., Ltd, Zhenhai, Ningbo (CN)

(72) Inventor: Hengyi Su, Ningbo (CN)

(73) Assignee: Ningbo WeiE Electronic Technology Co., Ltd. (CN)

( * ) Notice: Subject to any disclaimer, the term of this patent is extended or adjusted under 35 U.S.C. 154(b) by 201 days.

(21) Appl. No.: 15/202,719

(22) Filed: Jul. 6, 2016

(65) Prior Publication Data
US 2017/0040844 A1 Feb. 9, 2017

(30) Foreign Application Priority Data

Aug. 4, 2015 (CN) .......................... 2015 1 0472008
Aug. 4, 2015 (CN) ...................... 2015 2 0579872 U

(51) Int. Cl.
*H02J 50/12* (2016.01)
*H02J 7/02* (2016.01)

(52) U.S. Cl.
CPC ............. *H02J 50/12* (2016.02); *H02J 7/025* (2013.01)

(58) Field of Classification Search
CPC .................................. H02J 50/12; H02J 7/025
See application file for complete search history.

(56) References Cited

U.S. PATENT DOCUMENTS

| | | | | |
|---|---|---|---|---|
| 9,276,413 B1* | 3/2016 | Zhang | ..................... | H02J 50/12 |
| 9,843,199 B2* | 12/2017 | Bosshard | ................ | H02J 5/005 |
| 2010/0328969 A1* | 12/2010 | Meyer | ................... | H01L 41/044 |
| | | | | 363/21.03 |
| 2013/0257372 A1* | 10/2013 | Chen | ................... | B60L 11/1816 |
| | | | | 320/109 |
| 2014/0036545 A1* | 2/2014 | Reddy | ................. | H02M 3/3376 |
| | | | | 363/17 |
| 2014/0085944 A1* | 3/2014 | Lee | ......... | H02J 3/383 |
| | | | | 363/37 |
| 2014/0159501 A1* | 6/2014 | Kanno | .................... | H02J 17/00 |
| | | | | 307/104 |
| 2014/0225439 A1* | 8/2014 | Mao | .................... | H02M 3/3376 |
| | | | | 307/31 |
| 2015/0214738 A1* | 7/2015 | Covic | ...................... | H02J 3/32 |
| | | | | 307/31 |
| 2016/0056640 A1* | 2/2016 | Mao | ........................ | H02J 50/80 |
| | | | | 307/104 |
| 2017/0126067 A1* | 5/2017 | Koizumi | ............... | B60L 11/182 |
| 2017/0149285 A1* | 5/2017 | Ushijima | ................ | H02J 50/12 |
| 2017/0353053 A1* | 12/2017 | Muratov | ................. | H02J 50/12 |

* cited by examiner

*Primary Examiner* — Alfonso Perez Borroto
*Assistant Examiner* — Esayas Yeshaw
(74) *Attorney, Agent, or Firm* — Gearhart Law, LLC

(57) ABSTRACT

An efficient power transmitting terminal, a contactless power transmission device and a power transmission method are disclosed herein. By adjusting the equivalent output impedance of the DC-AC voltage converter through a soft-switching control circuit composed of an inductor or an inductor and a capacitor, the equivalent output impedance is maintained at inductive impedance. According to the feature of current of inductive impedance lagging behind the voltage, the voltage of the switching device in the DC-AC voltage converter reduces to zero before switching-on, to achieve zero-voltage switching-on.

5 Claims, 3 Drawing Sheets

EFFICIENT POWER TRANSMITTING TERMINAL, CONTACTLESS POWER TRANSMISSION DEVICE AND POWER TRANSMISSION METHOD

CLAIM OF PRIORITY

This application claims the priority benefit of Chinese Patent Applications Nos. 201510472008.2 and 201520579872.8, both filed on Aug. 4, 2015, the contents of which are hereby incorporated by reference into this application.

FIELD OF THE EMBODIMENTS

The present patent application relates to the power transmission field, and more specifically, to an efficient power transmitting terminal, a contactless power transmission device and a power transmission method.

BACKGROUND OF THE EMBODIMENTS

The contactless power transmission technology is widely used in the field of electronic products due to its convenient and practical features. Currently, the main methods to realize contactless power transmission include magnetic induction and magnetic resonance. The applications of magnetic induction is restricted due to the limitation of transmission distance, while the magnetic resonance wireless power transmission can achieve a long-distance, and high-power energy transmission, which can be widely used for the charging and power supply of electronic terminals, electric vehicles, underwater, and underground electrical equipments.

A typical wireless power transmission device is mainly composed of a power transmitting terminal and a power receiving terminal, both of which can achieve energy transmission through the electromagnetic induction or magnetic resonance. Wherein, a power transmitting terminal includes a transmitter coil and an inverter. The inverter receives DC voltage to produce AC voltage. The transmitter coil receives an alternating voltage to generate alternating magnetic field with frequency of $\omega_0$. The receiving coil of the power receiving terminal couples the alternating magnetic field to induce alternating voltage V sin($\omega$0) with a frequency of $\omega_0$. Generally, the lower the frequency of the alternating magnetic field, the shorter the distance power transmission. Therefore, in order to increase the distance of wireless power transmission, it is necessary to enhance the frequency of alternating magnetic field. According to the relevant standard of wireless charging, such as, Qi and PMA wireless charging standard, the frequency of alternating magnetic field is within the range of 100 kHz-500 kH in a electromagnetic induction wireless power transmission system, and the power transmission distance is normally less than one centimeter. According to the A4WP wireless charging standard, if the frequency of an alternating magnetic field is 6.78 MHz in a magnetic resonance wireless power transmission system, the corresponding power transmission distance can be up to several centimeters.

Therefore, in order to enhance the transmission distance, magnetic resonance wireless power transmission mode is normally adopted, and an alternating magnetic field at frequency of 6.78 MHz is generated. Accordingly, the switching device in the inverter should work at the frequency of 6.78 MHz. When the switching device is working at the frequency of 6.78 MHz, the switching device will have a large switching loss, which greatly reduces the life of the switch. In order to reduce the loss, usually a zero switching technology (ZVS) is adopted, to reduce the loss of the switching device.

SUMMARY OF THE EMBODIMENTS

In the patent application, an efficient power transmitting terminal, a contactless power transmission device and a power transmission method are disclosed herein. By adjusting the equivalent output impedance of the DC-AC voltage converter, the equivalent output impedance is maintained at inductive impedance. Thus, a switching device of the inverter can be switched on at zero-voltage moment, to achieve the soft switching switching-on, greatly reducing the loss of switch at high frequency.

According to one aspect of the patent application, an efficient power transmitting terminal, which is used to transmit energy to its isolated power receiving terminal, is provided. The power transmitting terminal includes a DC-AC voltage converter configured to receive a DC voltage to output a AC voltage with a preset frequency; a power transmitting portion; and a soft-switching control circuit.

The power transmitting portion includes a primary transmitter coil. The primary transmitter coil receives the AC voltage to generate an alternating magnetic field, to transmit energy to the power receiving terminal.

The soft-switching control circuit is connected between the DC-AC voltage converter and the power transmitting portion, and configured to adjust an equivalent output impedance of the DC-AC voltage converter, so that the equivalent output impedance is inductive impedance.

The preset frequency is consistent with a system operating frequency at the power transmitting terminal and the power receiving terminal.

Optional, the power transmitting portion further includes a primary resonant capacitor. A resonant frequency of the primary resonant capacitor and the primary transmitter coil is the preset frequency.

Optional, the soft-switching control circuit includes a first inductor. And two ends of the first inductor are connected to the DC-AC voltage converter and the power transmitting portion respectively.

Optional, an inductance value of the inductor is adjusted according to an operating current of the DC-AC voltage converter.

Optional, the soft-switching control circuit comprises a first inductor and a first capacitor. A first end of the first inductor is connected to a first output end of the DC-AC voltage converter, and a second end of the first inductor is connected to the power transmitting portion. A first end of the first capacitor is connected to a second end of the first inductor, and a second end of the first capacitor is connected to a second output end of the DC-AC voltage converter.

Optional, a resonant frequency of the first inductor and the first capacitor is consistent with the preset frequency.

According to another aspect of the patent application, a contactless power transmission method, transmitting energy through a power transmitting terminal and an isolated power receiving terminal, is provided. The method includes receiving a DC voltage via a DC-AC voltage converter to output an AC voltage with a preset frequency, adjusting an equivalent output impedance of the DC-AC voltage converter, so that the equivalent output impedance is an inductive impedance; receiving the AC voltage to generate an alternating magnetic field, to transmit energy to the power receiving terminal; and inducing the alternating magnetic field to obtain a corresponding alternating voltage, to convert the alternating voltage to an appropriate DC voltage to supply an output load. The preset frequency is consistent with a system operating frequency of the power transmitting terminal and the power receiving terminal.

Optional, the soft-switching control circuit is used to adjust and control the equivalent output impedance of the DC-AC voltage converter; and the soft-switching control circuit includes the first inductor.

Optional, an inductance value of inductor is adjusted according to an operating current of the DC-AC voltage converter.

Optional, the power transmission method further includes: using a soft-switching control circuit to adjust and control the equivalent output impedance of the DC-AC voltage converter. The soft-switching control circuit includes a first inductor and a first capacitor.

Optional, the resonant frequency of the first inductor and the first capacitor is set to be consistent with the preset frequency.

According to another aspect of the patent application, a contactless power transmission device is provided. The device includes the above power transmitting terminal; and a power receiving terminal. The power transmitting terminal and the power receiving terminal are isolated. The power receiving terminal includes a secondary receiving coil and a rectifying and filtering circuit. The secondary receiving coil induces an alternating magnetic field generating from the primary transmitter coil to obtain a corresponding alternating voltage. The rectifying and filtering circuit converts the alternating voltage to an appropriate DC voltage to supply an output load.

According to the aforesaid efficient power transmitting terminal, contactless power transmission device and power transmission method are disclosed herein, the equivalent output impedance is maintained at inductive impedance by adjusting the equivalent output impedance of the DC-AC voltage converter through a soft-switching control circuit composed of an inductor or an inductor and a capacitor. Based on the features of the current of inductive impedance lagging behind the voltage, the voltage of the switching device in the DC-AC voltage converter reduces to zero before switching-on, to achieve zero-voltage switching-on. The technical solutions herein can achieve the following beneficial effects:

1. reducing the loss of switches at a high frequency, to achieve efficient wireless power transmission;
2. the soft-switching control circuit adopts passive devices, easy to control, with low cost;
3. the soft-switching control circuit which includes inductors and capacitors can not only achieve switching-on of soft switching, but also set an appropriate resonant frequency as a impedance matching network of the power transmitting terminal, to achieve adjustment of the primary current and improve the power transmission efficiency of the system.

DESCRIPTION OF THE PREFERRED EMBODIMENTS

The patent application is described in details in combination with drawings and several preferred embodiments, but the patent application is no limited to these embodiments. Any alternatives, modifications, equivalents methods and schemes made within the essence and scope of the patent application shall fall within the scope of protection herein. In order to enable the public to have a thorough understanding of the patent application, specific details are described in the preferred embodiments herein, but those skilled in the art can fully understand the patent application without the description about these details.

Figure 1:
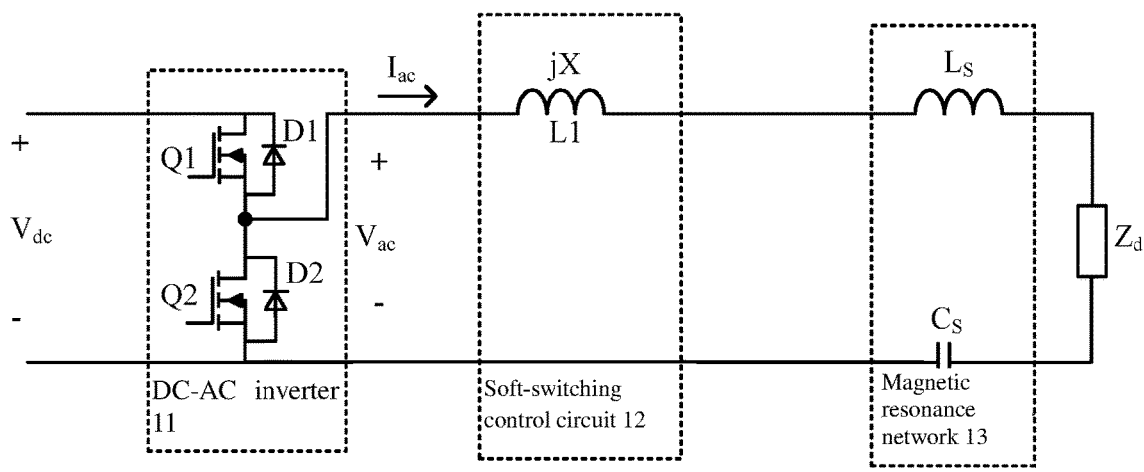
FIG. 1 shows a circuit block diagram of a power transmitting terminal according to the first embodiment of the patent application.
Figure 3:
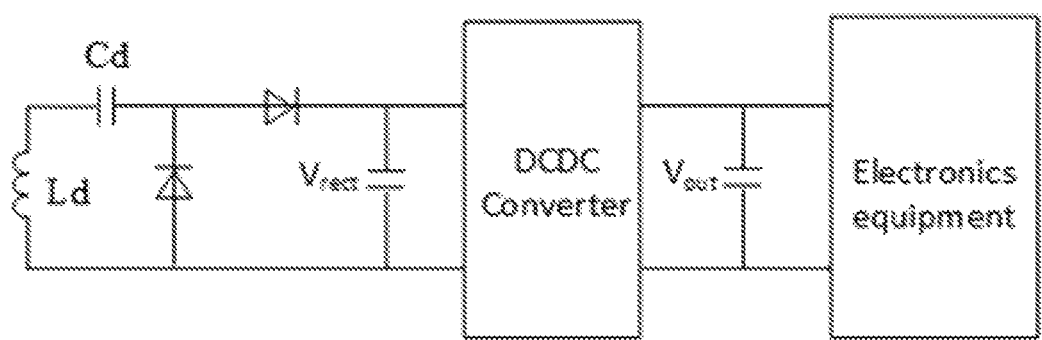
FIG. 3 shows a circuit of a power receiving terminal according to an embodiment of the patent application.

FIG. 1 is a circuit block diagram of a power transmitting terminal according to the first embodiment of the patent application. FIG. 3 shows a circuit of a power receiving terminal according to an embodiment of the patent application. The power transmitting terminal is applied to a contactless power transmission system, and the power transmitting terminal can transmit energy to the power receiving terminal isolated, as shown in FIG. 3. The equivalent impedance of the power receiving terminal is marked $Z_d$ as shown in FIG. 1. In this embodiment, the power transmitting terminal includes a DC-AC voltage converter 11 (i.e. DC-AC inverter), a soft-switching control circuit 12 and a power transmitting portion (the power transmitting portion is a magnetic resonance network 13 as shown in FIG. 1). The magnetic resonance network 13 includes a primary transmitter coil Ls and a primary resonant capacitor Cs. When the requirements for circuit parameters are not high or the stray capacitance of a circuit is large, the primary resonant capacitor Cs is not necessary. But the person skilled in the art should aware that, when no resonant capacitor is set in a circuit, it is required to set a blocking capacitor for a power transmitting terminal to isolate the DC bias output from a DC-AC inverter.

Specifically, the DC-AC inverter 11 can adopt a variety of means in the prior arts or modifications thereof, for example, various inverter circuits such as a full-bridge inverter, a half-bridge inverter, a Class D or Class E inverter. In FIG. 1, taking a Class D inverter as an example, a DC-AC inverter includes an upper switching tube Q1 and a lower switching tube Q2. The upper switching tube Q1 and the lower switching tube Q2 are metallic oxide semiconductor field effect transistor (MOSFET), and they have a body diode D1 and a body diode D2 respectively. The person skilled in the art should aware that, the upper switching tube Q1 and the lower switching tube Q2 are not limited to the above transistors, which can also be a combination of individual switching tubes and diodes with the same functions. The DC-AC inverter 11 receives a DC voltage $V_{dc}$ to output an AC voltage with preset frequency $V_{ac}$, and the preset frequency is consistent with the system operating frequency of the contactless power transmission device, denoted by $\omega_0$. The system operating frequency of the wireless power transmission device is preset according to the circuit structure and efficiency requirements.

In this embodiment, in order to improve the transmission efficiency of the system, the resonant frequency of the primary transmitter coil Ls and the primary resonant capacitor Cs is set to be consistent with the system's consistent frequency. The primary transmitter coil Ls receives the AC voltage with a frequency of $\omega_0$ to generate an alternating magnetic field, to transmit energy to the power receiving terminal. The secondary receiving coil of the power receiving terminal induces the alternating magnetic field generating from the primary transmitter coil, to obtain the corresponding alternating voltage. Then, the rectifying and filtering circuit will convert the alternating voltage to an appropriate DC voltage to supply the output load.

Further, the soft-switching control circuit 12 in this embodiment specifically includes a first inductor L1. A first end of the first inductor is connected to the common connection point of the upper switching tube Q1 and the lower switching tube Q2. The second end is connected to the primary transmitter coil Ls. The impedance value of the first inductor is set $j\omega_0 L = jX$.

The principle of soft switching control is described according to the circuit structure shown in FIG. 1. The resonant frequency of the primary transmitter coil Ls and the primary resonant capacitor Cs is $\omega_0$, therefore, during the operation of the contactless power transmission system, when the system frequency is $\omega_0$, the equivalent impedance of the magnetic resonance network is zero. At this time, the equivalent output impedance Z of the DC-AC inverter is:

$$Z = jX + Zd \quad (1)$$

According to the formula (1), the equivalent output impedance of the DC-AC inverter presents inductive impedance regardless of whether there is change to the output load or when there is change to the coupling between a power receiving terminal and a power transmitting terminal. According to the features of the current of inductive impedance lagging behind the voltage, the switching tube of the DC-AC inverter can achieve switching-on of zero voltage. Specifically, when the upper switching tube Q1 is switched on and the lower switching tube Q2 is switched off, the current phase of the inductor L1 on both end may lag behind the voltage phase. Then, the upper switching tube Q1 is switched off, to enter a dead-time interval. At this time, since the current of the first inductor L1 is not zero, follow current will occur via a first inductor L1, a primary transmitter coil Ls, a resonant capacitor Cs and a body diode D2 of a lower switching tube, the voltage drop of the lower switching tube Q2 will drop to zero, to switch on the switching tube Q2, to achieve a zero-voltage switching-on. According to the same principle, for the upper switching tube Q1, zero-voltage switching-on can be achieved via the first inductor L1.

It should be added that, the formula of current $I_{ac}$ of DC-AC inverter is:

$$I_{ac} = \frac{V_{ac}}{|Z|} = \frac{V_{ac}}{|jX + Zd|} = \frac{V_{ac}}{\sqrt{X^2 + Zd^2}} \quad (2)$$

As shown from the formula (2), when the output load increases or the coupling between the power transmitting terminal and the power receiving terminal becomes strong, the secondary equivalent impedance $Z_d$ will increase. Thereby, the inverter operating current Iac will decrease accordingly, and the energy to achieve zero-voltage switching-on of the switching device in the inverter will be reduced accordingly. Therefore, in order to ensure that ZVS can be achieved in the whole work cycle, it is necessary to reasonably choose an inductance value of the inductor L1 or adjust the dead-time between switching tubes. For example, when the inverter operating current Iac decreases, the inductance value of the first inductor L1 can be reduced or the dead-time between switching tubes can be added appropriately, to ensure that the voltage-drop can drop to zero before the lower switching tube is switched on.

According to the above technical solutions, the soft-switching control circuit in the patent application can adjust the equivalent output impedance of the DC-AC inverter, so that the equivalent impedance in working is inductive. According to the features of inductive impedance, the switching tube of the inverter can switch on at zero-voltage in working, to achieve soft-switching switching-on. In the patent application, a soft switching switching-on is achieved by passive components that are easy to control, requiring no complex control circuit. It can greatly reduce switching losses at a high frequency, effectively improving the working efficiency of the system.

Figure 2:
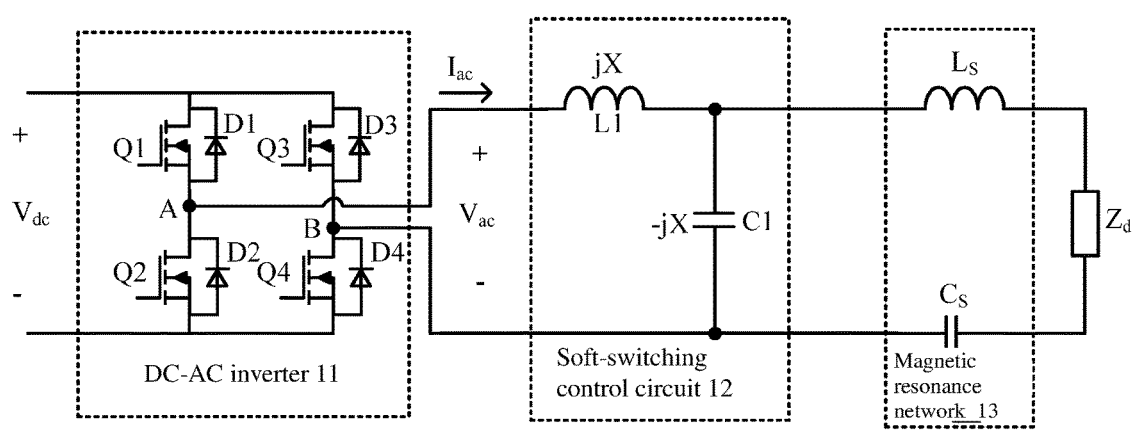
FIG. 2 shows a circuit block diagram of a power transmitting terminal according to the second embodiment of the patent application.

FIG. 2 shows a circuit block diagram of a power transmitting terminal according to a second embodiment of the patent application. In this embodiment, the magnetic resonance network 13 is the same as that in the previous embodiment, which is not described again. In this embodiment, taking the full-bridge switching inverter as an example for the DC-AC inverter 11, as shown in FIG. 2, the DC-AC inverter 11 includes a first upper switching tube Q1, a second upper switching tube Q3, a first lower switching tube Q2 and a second lower switching tube Q4. The switching tubes of the inverter in this embodiment are transistors with body diodes as examples but not limited, as shown in FIG. 2, the body diodes of four switching tubes are D1, D2, D3 and D4, respectively.

Further, in this embodiment, the soft-switching control circuit 12 includes a first inductor L1 and a first capacitor C1. A first end of the first inductor L1 is connected to a first output end of the full-bridge switching inverter, as shown in point A in FIG. 2. A second end is connected to a first end of the primary transmitter coil. The first end of the first capacitor C1 is connected to the second end of the first inductor, and the second end is connected to the second output end of the full-bridge switching inverter, as shown in point B in FIG. 2.

Preferably, in this embodiment, the resonant frequency of the first inductor L1 and the first capacitor C1 is set to be consistent with the preset frequency $\omega_0$, that is $\omega_0 = 1/\sqrt{LC}$, where, L is the inductance value of the first inductor, C is the capacitive reactance of the first capacitor. The impedance of the first inductor L1 is defined as $j\omega_0 L = jX$ the impedance of the first capacitor C1 is defined as $-jX$. When the resonant frequency of the primary transmitter coil Ls and the primary resonant capacitor Cs is $\omega_0$, the equivalent impedance of the magnetic resonance network is zero, then the equivalent output impedance Z of the DC-AC inverter is as follows:

$$Z = jX + \frac{(-jX) \cdot Zd}{-jX + Zd} = \frac{jX^3}{X^2 + Zd^2} + \frac{X^2 \cdot Zd}{X^2 + Zd^2} \quad (3)$$

According to the formula (3), the equivalent output impedance of the DC-AC inverter equivalent is inductive. According to the feature of current of the inductive impedance lagging behind the voltage, the switching tubes of DC-AC inverter can achieve zero-voltage switching-on. Specifically, when the first upper switching tube Q1 and the second lower switching tube Q4 are switched on, and the first lower switching tube Q2 and second upper switching tube Q3 are switched off. Since the equivalent output impedance of the inverter is inductive impedance, the current phase of the inductive impedance will lag behind the voltage phase. Then, the first upper switching tube Q1 and the second lower switching tube Q4 are switched off to enter a dead-time interval. At this time, the first inductor L1 current is not zero. The follow current will occur via a first inductor L1, a primary transmitter coil Ls, a resonant capacitor Cs, a body diode D2 of the first lower switching tube and a body diode D3 of the second upper switching tube, to switch on the first lower switching tube Q2 and the second upper switching tube Q3, to achieve zero-voltage switching-on. According to the same principle, for the first upper switching tube Q1 and the second lower switching tube Q4, zero-voltage switching-on can be achieved via the first inductor L1 and the first capacitor C1.

According to the operating principle of the circuit, the operating current of the DC-AC inverter (Iac) is:

$$I_{ac} = \frac{V_{ac}}{|Z|} = \frac{V_{ac} \cdot (X^2 + Zd^2)}{X^2 \cdot \sqrt{X^2 + Zd^2}} = \frac{V_{ac}\sqrt{X^2 + Zd^2}}{X^2} \quad (4)$$

According to the formula (4), the operating current of the DC-AC inverter (Iac) is less affected by the external conditions. When the output load increases, the equivalent impedance $Z_d$ becomes large, and the current of the DC-AC inverter increases accordingly. At this time, it can facilitate the soft switching switching-on of the switching device in the inverter. Compared with the soft-switching control circuit with the inductor L only, the dead time of the switching tube needs not to be adjusted in this embodiment, to achieve soft switching and improve the working efficiency.

In the above embodiment, when the resonant frequency of the first inductor L1 and the first capacitor C1 is set to $\omega_0$, the soft-switching control circuit can be used as an impedance matching circuit of the power transmitting terminal. In the Chinese patent application No. 201510011896.8, when the resonant frequency of the first inductor L1 and the first capacitor C1 is set to the system operating frequency ($\omega_0$), the impedance matching circuit formed by the soft-switching control circuit is capable of adjusting the current of a primary transmitter coil to an alternating current with constant frequency and constant amplitude, thus, improving the transmission efficiency of wireless power.

The soft-switching control circuit in this embodiment can achieve the zero-voltage switching-on of the switching tube in the inverter via the first inductor and first capacitor. The circuit is simple but effective; in addition, the soft-switching control circuit can be simultaneously used as an impedance matching circuit of the primary side, which enhances the power transmission efficiency of the system while achieving soft switching.

It should be noted that a half-bridge inverter and a full-bridge inverter are respectively used as an example of a DC-AC inverter in the above two embodiments, but not limited to the above combinations. For example, a soft-switching control circuit of a combination of a first inductor and a second capacitor can adjust a break-over voltage of a switching tube of half-bridge inverter, to achieve soft switching switching-on. A soft-switching control circuit composed of a first inductor can also adjust a break-over voltage of a switching tube of full-bridge inverter, to achieve soft switching switching-on. Moreover, the above two soft-switching control circuits can be applied to a DC-AC inverter such as a Class D inverter and a Class E inverter in the prior art. This patent application also disclose a contactless power transmission method, transmitting energy through the power transmitting terminal and the power receiving terminal that are isolated each other. The method includes the following steps:

receiving DC voltage via a DC-AC voltage converter to output an AC voltage with a preset frequency;

adjusting an equivalent output impedance of the DC-AC voltage converter, so that the equivalent output impedance is an inductive impedance;

receiving the AC voltage to generate alternating magnetic field, to transmit energy to the power receiving terminal; and inducing the alternating magnetic field to obtain a corresponding alternating voltage, to convert the alternating voltage to an appropriate DC voltage to supply an output load.

The preset frequency is consistent with a system operating frequency of the power transmitting terminal and the power receiving terminal.

Optional, a soft-switching control circuit composed of a first inductor is used to adjust and control the equivalent output impedance of the DC-AC voltage converter. The inductance value of inductor is adjusted according to an operating current of the DC-AC voltage converter.

Optional, a soft-switching control circuit composed of a first inductor and a first capacitor is used to adjust and control the equivalent output impedance of the DC-AC voltage converter, and the resonant frequency of the first inductor and the first capacitor is set to be consistent with the preset frequency.

Finally, this patent application further discloses a contactless power transmission device, including a power transmitting terminal and a power receiving terminal. The power transmitting terminal is the aforesaid power transmitting terminal. The power receiving terminal includes a secondary receiving coil and a rectifying and filtering circuit. The secondary receiving coil induces the alternating magnetic field generating from the primary transmitter coil to obtain the corresponding alternating voltage. The rectifying and filtering circuit converts the alternating voltage to appropriate DC voltage to supply the output load. Similarly, the contactless power transmission device can also achieve soft switching switching-on of a switching device of a DC-AC voltage converter, to reduce the loss of switching device at high frequency, and at the same time, the soft switching and impedance matching functions can be achieved via a soft switching circuit composed of a first inductor and a first capacitor, which requires less devices but with high system efficiency.

The efficient power transmitting terminal and contactless power transmission device in the preferred embodiments are described in details above, and those ordinary the person skilled in the art can extrapolate other techniques or structures and circuit layout, components that can be applied in the aforesaid embodiments.

The above embodiments do not describe all details nor limit the patent application. Apparently, many modifications and variations can be made according to the above descriptions. These embodiments in the patent application are to explain the principle and actual application of the patent application, so that the person skilled in the art can make good use of the patent application or modify to use them. The patent application is limited only by the claims and their full scope and equivalents.

What is claimed is:

1. An efficient power transmitting terminal, transmitting energy to its isolated power receiving terminal, comprising:

a DC-AC voltage converter configured to receive a DC voltage to output an AC voltage with a preset frequency, the DC-AC voltage converter comprising a first switching tube and a second switching tube connected in series;

a power transmitting portion, comprising a primary transmitter coil, wherein the primary transmitter coil receives the AC voltage to generate an alternating magnetic field, to transmit energy to the power receiving terminal; and a soft-switching control circuit, connected between the DC-AC voltage converter and the power transmitting portion, and configured to adjust an equivalent output impedance of the DC-AC voltage converter, so that the equivalent output impedance is inductive impedance;

wherein the preset frequency is consistent with a system operating frequency at the power transmitting terminal and the power receiving terminal;

wherein the soft-switching control circuit consists of a first inductor, and two ends of the first inductor are connected to a common connection point of the first and the second switching tubes and the power transmitting portion respectively; and an inductance value of the first inductor and a dead-time between the first and second switching tubes are adjusted to achieve a zero-voltage switching-on of the first and second switching tubes.

2. The power transmitting terminal according to claim 1, wherein the power transmitting portion further comprises a primary resonant capacitor, a resonant frequency of the primary resonant capacitor and the primary transmitter coil is the preset frequency.

3. A contactless power transmission method, transmitting energy through a power transmitting terminal and an isolated power receiving terminal, comprising:

receiving a DC voltage via a DC-AC voltage converter to output an AC voltage with a preset frequency, wherein the preset frequency is consistent with a system operating frequency of the power transmitting terminal and the power receiving terminal, the DC-AC voltage converter comprising a first switching tube and a second switching tube connected in series;

adjusting an equivalent output impedance of the DC-AC voltage converter, so that the equivalent output impedance is an inductive impedance;

receiving the AC voltage to generate an alternating magnetic field, to transmit energy to the power receiving terminal; and inducing the alternating magnetic field to obtain a corresponding alternating voltage, to convert the alternating voltage to an appropriate DC voltage to supply an output load;

wherein the soft-switching control circuit is used to adjust and control the equivalent output impedance of the DC-AC voltage converter;

the soft-switching control circuit consists of a first inductor, and two ends of the first inductor are connected to a common connection point of the first and the second switching tubes and the power transmitting portion respectively; and an inductance value of the first inductor and a dead-time between the first and second switching tubes are adjusted to achieve a zero-voltage switching-on of the first and second switching tubes.

4. A contactless power transmission device, comprising:
a power transmitting terminal of claim 1; and
a power receiving terminal; wherein the power transmitting terminal and the power receiving terminal are isolated; and
wherein the power receiving terminal comprises a secondary receiving coil and a rectifying and filtering circuit, the secondary receiving coil induces an alternating magnetic field generating from the primary transmitter coil to obtain a corresponding alternating voltage, the rectifying and filtering circuit converts the alternating voltage to an appropriate DC voltage to supply an output load.

5. A contactless power transmission device, comprising:
a power transmitting terminal of claim 2; and
a power receiving terminal; wherein the power transmitting terminal and the power receiving terminal are isolated; and
wherein the power receiving terminal comprises a secondary receiving coil and a rectifying and filtering circuit, the secondary receiving coil induces an alternating magnetic field generating from the primary transmitter coil to obtain a corresponding alternating voltage, the rectifying and filtering circuit converts the alternating voltage to an appropriate DC voltage to supply an output load.

* * * * *